(No Model.) 5 Sheets—Sheet 1.

W. T. BLAINE.
COMBINED CASH TILL AND RECORDER.

No. 564,045. Patented July 14, 1896.

(No Model.) 5 Sheets—Sheet 3.

W. T. BLAINE.
COMBINED CASH TILL AND RECORDER.

No. 564,045. Patented July 14, 1896.

Attest
John L. Tunison
M. P. Smith

Inventor
W. T. Blaine
By Higdon & Higdon & Longan
Attys.

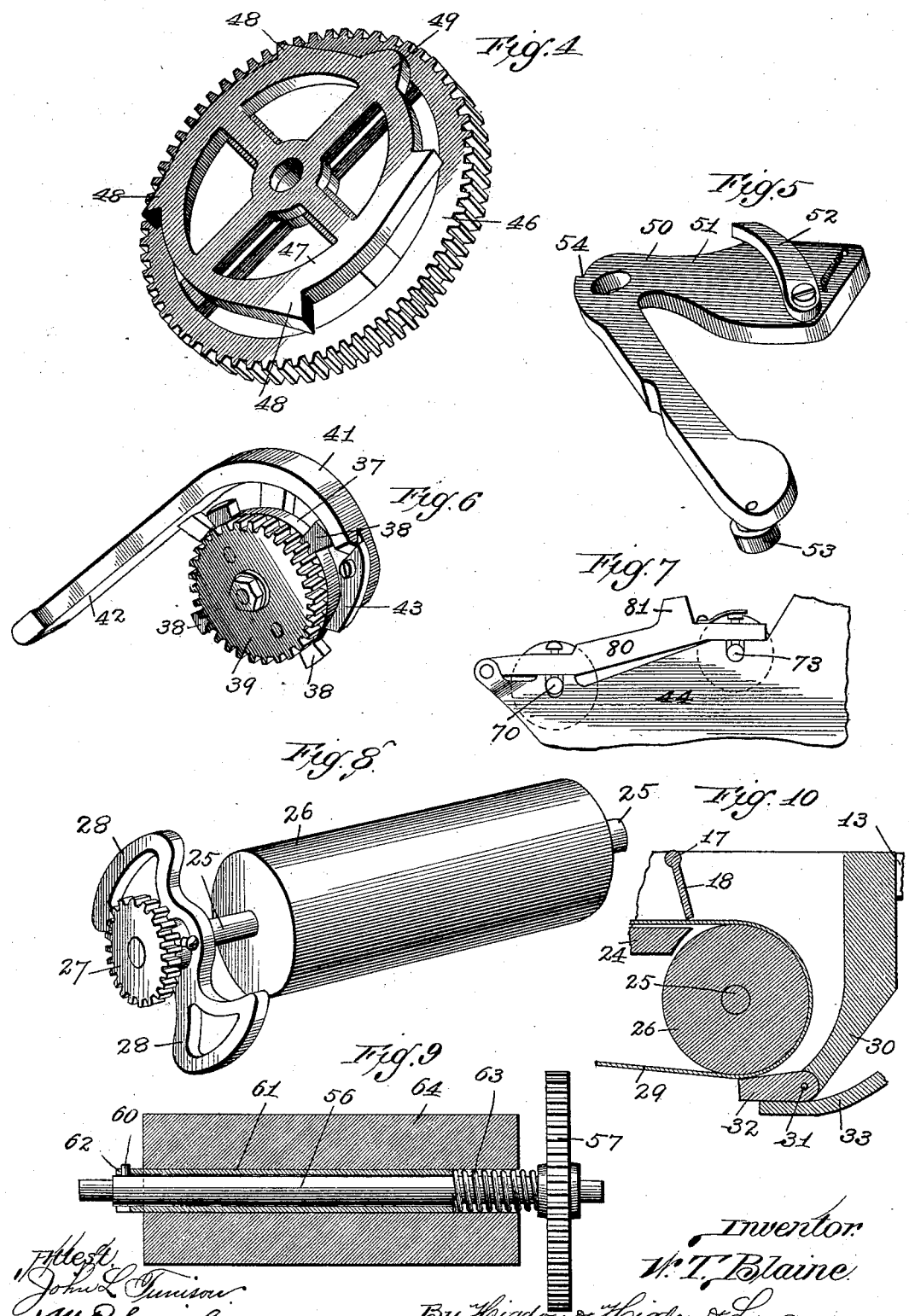

(No Model.) 5 Sheets—Sheet 5.
W. T. BLAINE.
COMBINED CASH TILL AND RECORDER.
No. 564,045. Patented July 14, 1896.
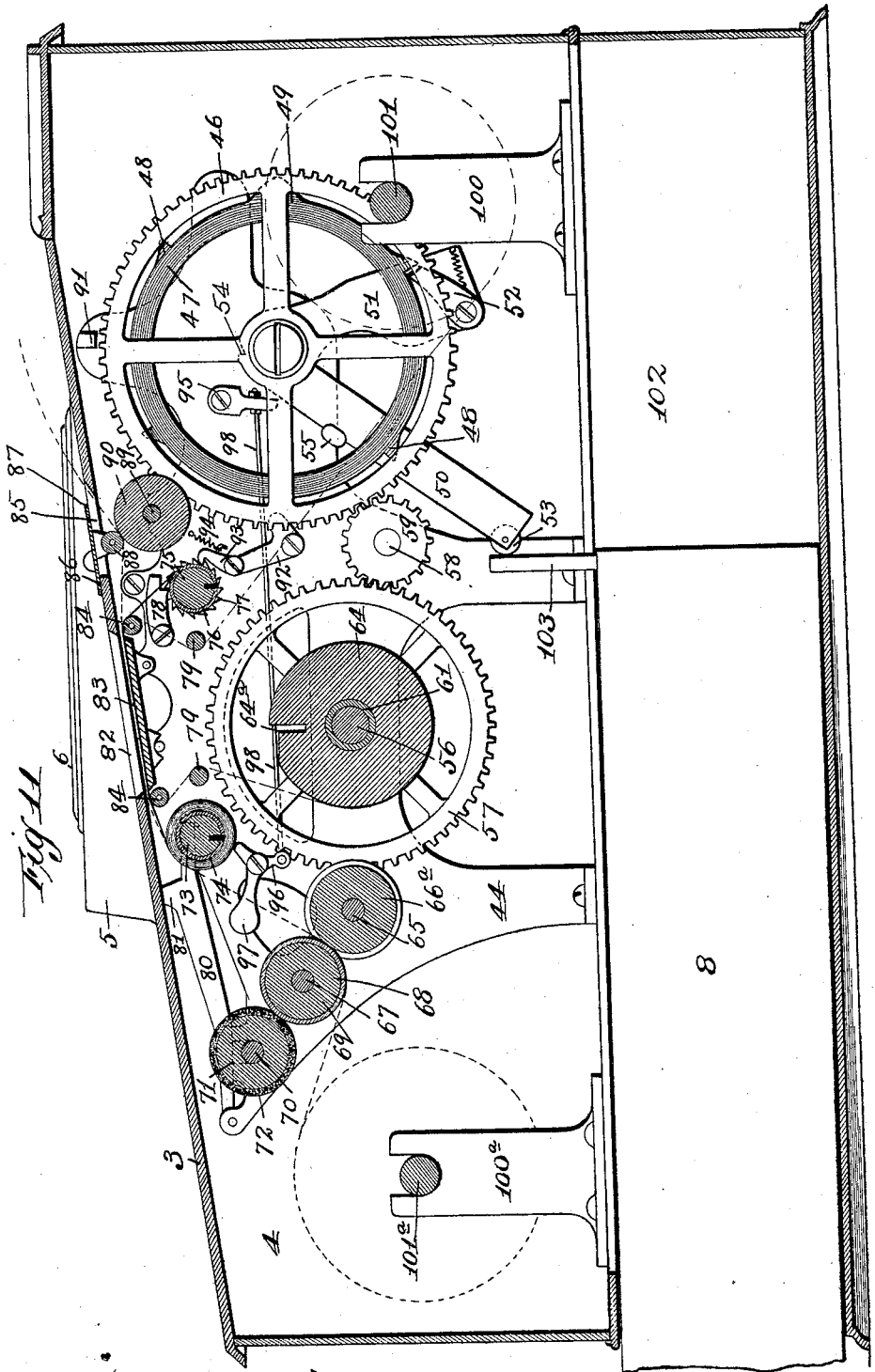

UNITED STATES PATENT OFFICE.

WILLIAM THOMAS BLAINE, OF ST. LOUIS, MISSOURI.

COMBINED CASH-TILL AND RECORDER.

SPECIFICATION forming part of Letters Patent No. 564,045, dated July 14, 1896.

Application filed January 10, 1896. Serial No. 574,977. (No model.)

*To all whom it may concern:*

Be it known that I, WILLIAM THOMAS BLAINE, of the city of St. Louis, State of Missouri, have invented certain new and useful Improvements in a Combined Cash-Till and Recorder, of which the following is a full, clear, and exact description, reference being had to the accompanying drawings, forming a part hereof.

My invention relates to a combined cash-till and sales-recorder, and is an improvement on the devices shown in Patents No. 391,958, granted October 30, 1888; No. 539,007, granted May 7, 1895, and No. 547,485, granted October 8, 1895, of all of which patents I am now the sole owner.

My invention consists in the novel construction, combination, and arrangement of parts hereinafter described and claimed.

Figure 1:
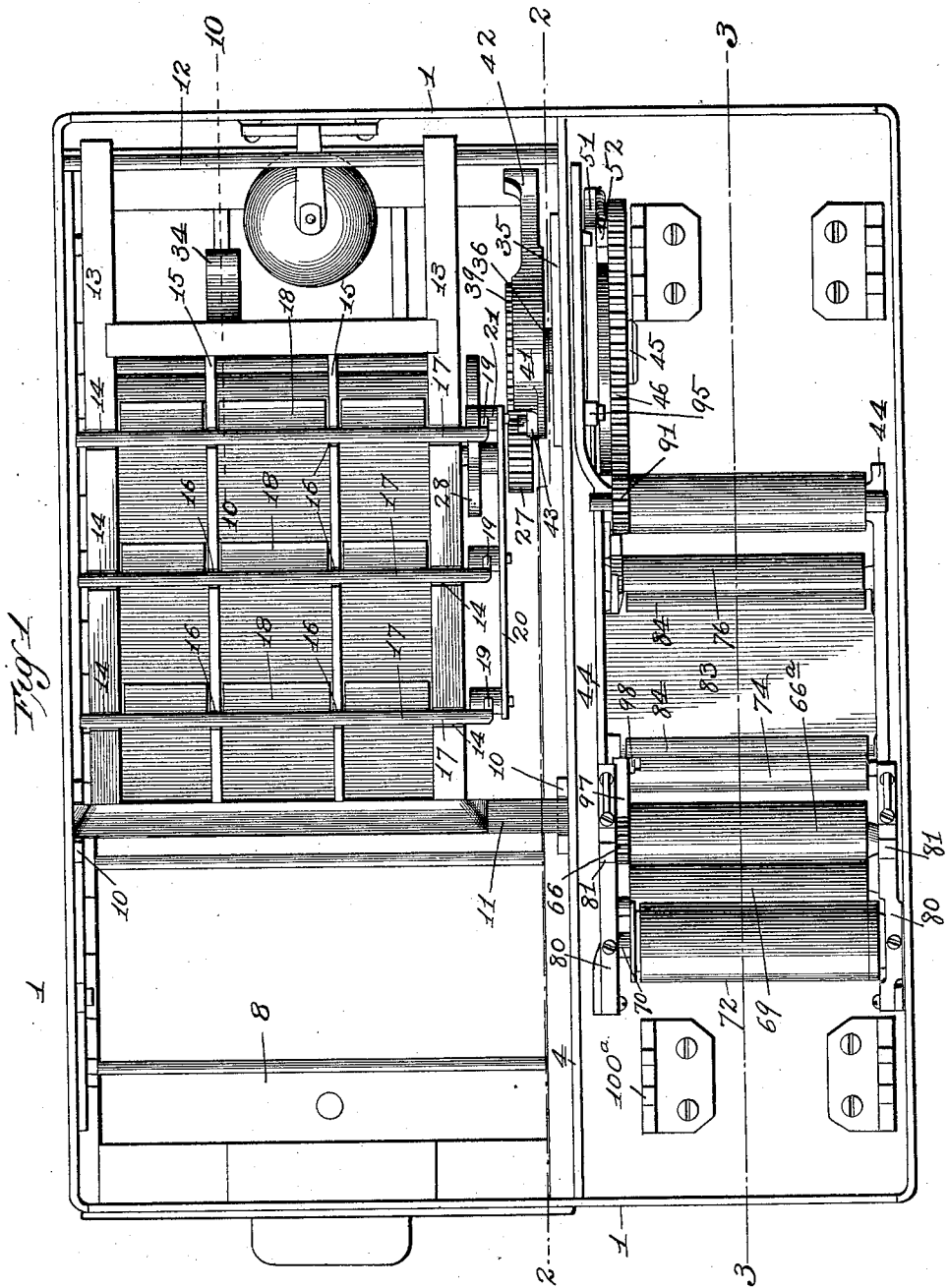
Figure 2:
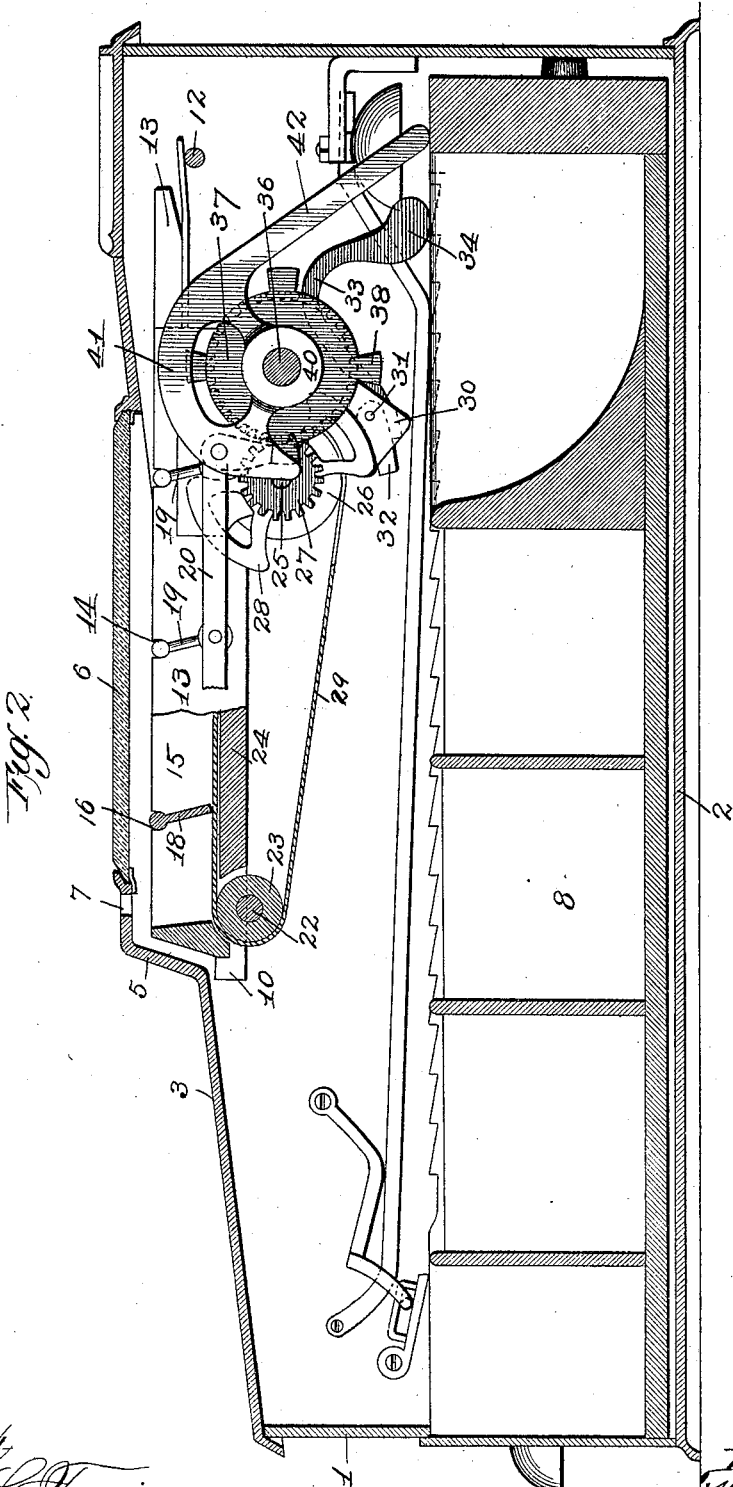
Figure 3:
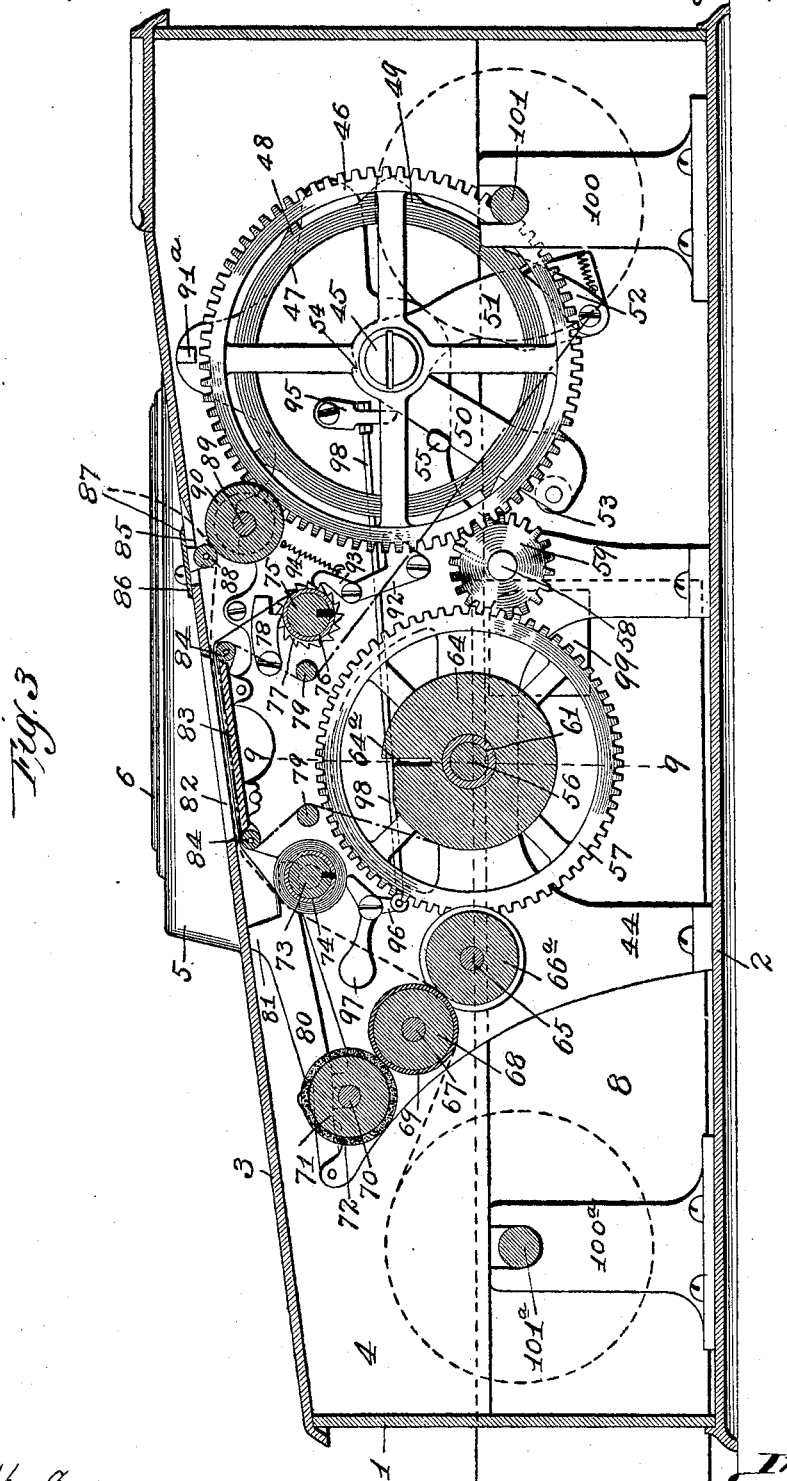

In the drawings, Figure 1 is a top plan view of my improved recorder, the top part of the casing being removed therefrom in order that the interior mechanism of said recorder may be clearly seen. Fig. 2 is a longitudinal sectional view taken approximately on the indicated line 2 2 of Fig. 1. Fig. 3 is a longitudinal sectional view taken approximately on the indicated line 3 3 of Fig. 1. Fig. 4 is a view in perspective of the master gear-wheel and ratchet-wheel carried thereby, the same being made use of in operating the mechanism in the recording portion of the device. Fig. 5 is a view in perspective of a gravity-pawl-carrying bell-crank, the same being made use of to operate the ratchet-wheel seen in Fig. 4. Fig. 6 is a view in perspective of a pinion combined with a ratchet-wheel and the pawl and arm for operating the same, said pinion and ratchet-wheel being made use of in actuating the coin-displaying mechanism of my improved device. Fig. 7 is a detail side elevation of a portion of the frame of the recording side of the device and the hinged bar made use of in retaining the trunnions operating in said bearings. Fig. 8 is a view in perspective of a shaft carrying a drum, double eccentric, and a pinion, the same being made use of in the coin-displayer of my improved device. Fig. 9 is a horizontal sectional view taken approximately on the indicated line 9 9 of Fig. 3. Fig. 10 is a longitudinal detail sectional view taken approximately on the indicated line 10 10 of Fig. 1. Fig. 11 is a longitudinal sectional view analogous to Fig. 3, but showing the cash-drawer operating in a plane below the entire mechanism of the till-recorder.

Referring by numerals to the accompanying drawings, 1 indicates a rectangular casing provided with a bottom plate 2 and slightly-inclined top 3. Extending longitudinally in this casing is a vertically-arranged partition 4, the same extending downwardly from the top 3 to a point approximately halfway between the top and bottom plates. This partition divides the casing into two compartments, in the larger one of which the cash-till and coin-displaying mechanism is located and in the smaller compartment is located the recording mechanism.

Formed integral with and extending upwardly from the top 3 of the casing and at a point directly above the center of the compartment in which the till and coin-displayer is located is a rectangular casing 5, in the top of which is fixed a transparent plate 6. Immediately in front of this plate 6 and extending transversely in the casing 5 is a slot 7. Arranged to slide longitudinally in the lower half of the larger compartment and below the glazed portion of the top 3 is the cash-till 8, a detailed description of said till and the mechanism for preventing the withdrawal of the same after it has been partially pushed in being herein not essential, as the same is fully described in the patents hereinbefore referred to.

Fixed upon the faces of the side of the casing 1 and the partition 4 within the larger compartment at a point slightly below the transverse slot 7 are pairs of lugs 10 in which is transversely arranged a bar 11. Extending transversely between the partition 4 and the side wall above referred to at the rear of the casing is a rod 12, and upon said rod 12 and the transverse bar 11 is removably located a rectangular frame 13, in the top edges of the side bars of which are formed alined bearings 14. Extending longitudinally between the front and end bars of the rectangular frame 13 are partitions 15, the same being provided with bearings 16 in alinement with the bearings 14, and in said alined bearings 14 and 16 are mounted for rotation shafts 17. Formed integral with and extending downwardly from these shafts 17 between the partitions 15 and the sides of the rectangular frame 13 are wings 18. Formed integral with and extending downwardly from the ends of these shafts 17 at one side are arms 19, the lower ends of which are pivoted to a longitudinally-oscillating bar 20, there being an antifriction-roller 21 mounted upon a pin that pivots the forward end of said bar 20 to the forward one of the arms 19.

Journaled in suitable bearings fixed to the under side of the forward end of the frame 13 is a transversely-extending shaft 22, which carries a drum 23, the top of said drum 23 being arranged in the same plane with the top of the bottom 24 of said frame 13. Arranged to rotate in suitable bearings fixed to the under side of the opposite end of said frame 13 is a transversely-arranged shaft 25, which carries a drum 26, the top of which operates in the same plane with the top of the bottom 24, and said shaft 25 has fixed upon one of its ends a pinion 27, and upon said shaft 25 between said pinion 27 and the drum 26 is fixed a double eccentric 28, the same being similar in form to the numeral 8, said eccentric operating in such a plane as that its opposite ends will engage against the roller 21 previously mentioned.

Passing around the drums 23 and 26 and over the bottom 24 is an endless carrier 29. The rear bar or rail of the rectangular frame 13 is extended downwardly, as indicated by 30, (see Fig. 10,) and pivoted upon a pin 31, passing transversely through the lower portion of said extended end 30, is a wing 32, that is arranged so that its forward end may swing upwardly against the endless carrier 29, passing around the drum 26. Fixed to the under side of this wing 32 is a bent arm 33, the lower end of which is weighted, as indicated by 34, and said lower end 34 normally rides upon one of the longitudinal partitions in the cash-till 8. When said weighted lower end 34 is riding upon the partition, the forward edges of the wing 32 are held out of engagement with the endless carrier 29. Fixed to the face of the partition 4 on the inside of the compartment occupied by the cash-till, above the same and in the same horizontal plane as that occupied by the shaft 25, is a plate 35, from which projects a stud 36, and upon said stud is arranged for rotation a disk 37, the same having formed integral with its periphery four lugs or projections 38, the same being arranged at right angles to one another.

Carried by the face of the disk 37 and arranged to rotate therewith is a pinion 39, the same meshing with the pinion 27. Loosely arranged upon the stud 36 between the disk 37 and the plate 35 is a hub 40, from which radiate a pair of arms, the outer ends of which carry the semicircularly-bent upper end 41 of an arm 42, the lower end of said arm 42 being weighted and normally riding upon the top edge of one of the sides of the cash-till 8. Pivoted to the face of the bent portion 41 of this arm and adjacent the point thereof is a pawl 43, the point of which engages against the lugs or teeth 38. This completes the cash-till and coin-displayer and mechanism for operating the same. Arranged between the partition 4 and the side of the casing 1 in the smaller compartment is a pair of frames 44 of suitable size and form, the same serving as supports for the journals of the various shafts in the recording mechanism. Upon the inner face of one of these frames nearest the partition 4 and adjacent one end thereof is fixed a stud 45, upon which stud is arranged for rotation the master gear-wheel or pinion 46, and to the hub of said gear-wheel is fixed the hub of a ratchet-wheel 47, the teeth 48 of said ratchet-wheel being four in number and arranged at right angles to one another. Formed integral with the periphery of said wheel 47 between two of the teeth is a lug 49.

50 indicates a bell-crank that is pivoted upon the stud 45 between the ratchet-wheel 47 and the frame 44. The shorter arm 51 of this bell-crank is weighted and carries a spring-actuated pawl 52, the point of which engages the teeth 48 of the ratchet-wheel 47. The other arm of said bell-crank 50 is provided at its lower end with an antifriction-roller 53, and formed in the hub of said bell-crank is a notch 54. The forward movement of this bell-crank is limited by the longer arm engaging with a lug 55, formed integral with the inner face of the frame 44 nearest the partition 4.

Journaled in suitable bearings formed integral with the inner faces of the frames 44 and extending transversely at a point approximately midway between the ends of said frames is a shaft 56, upon one end of which is fixed a gear-wheel 57, that is in direct alinement with the master gear-wheel 46. Journaled upon a stud 58, that is carried by the frame 44 nearest the partition 4, is a pinion 59, that is in mesh with the gear-wheels 46 and 57. Upon the end of the shaft 56 opposite from the end on which the gear-wheel 57 is fixed is a pin 60, and arranged to slide longitudinally upon the shaft 56 between said pin 60 and the gear-wheel 57 is a sleeve 61, in the end of which adjacent the pin is formed a series of notches 62. An expansive coil-spring 63 is interposed between the end of the sleeve 61 and the hub of the gear-wheel 57, said coil-spring normally holding said sleeve against the pin 60, it being located in one of the notches 62. Fixed to and carried by the sleeve 61 is a drum 64, in which is formed a longitudinally-extending slot 64$^a$.

Journaled transversely between the frame 44 in front of and in the same plane with the shaft 56 is a shaft 65, upon one end of which is a pinion 66, that is in mesh with and driven by the gear-wheel 57, and said shaft 65 also carries a pressure-drum 66$^a$. A second shaft 67 is journaled transversely between the frames 44 at a point immediately in front and above said shaft 65, said shaft 67 carrying a drum 68, upon the periphery of which is located a plate of rubber or analogous material 69, this being for the purpose of printing an advertisement, or any matter desired, upon the web of paper that is fed between the drums 66ª and 68. A third shaft 70 is journaled between the frames 44 at a point above and in front of the shaft 67, and said shaft 70 carries a drum 71, on the periphery of which is located a body of flexible absorbent material 72, the periphery of which contacts with the periphery of the printing-plate 69 as the shafts 67 and 70 are rotated, thus inking said printing-plate.

Journaled transversely between the frames 44 at a point above the shafts 56 and 65 is a shaft 73, upon which is arranged for partial rotation a sleeve 74. At a point between the shaft 56 and the stud 45 and in the same plane with the shaft 73 is a shaft 75, upon which is arranged for slight rotation a sleeve 76, and upon the end of the shaft 75 adjacent the frame 44 nearest the partition is a ratchet-wheel 77. A gravity-pawl 78 is pivoted to the frame nearest the partition in a plane above the shaft 75, the point of said pawl engaging between the teeth of the ratchet-wheel 77. Extending transversely between the frames 44 at points between the shafts 73 and 75 are rollers 79. Plates 80 are hinged at their rear ends to the forward ends of each of the frames 44, said plates extending from thence rearwardly over the journal-bearings formed for the ends of the shafts 70 and 73. Said plates 80 are provided with upwardly-extending lugs 81, which normally lie directly against the under side of the top plate 3 of the casing. Formed in this top plate 3 at a point directly above and between the shafts 73 and 75 is a transversely-extending rectangular aperture 82, beneath which is located a movable plate 83. Journaled transversely between the frames 44 at each end of this plate 83 are rollers 84.

Formed in the top plate 3 at a point slightly in the rear of the aperture 82 and extending transversely is an aperture 85, that is covered by a plate 86, the forward end of which is knife-edged, as indicated by 87. Depending from this plate 86 are bearings in which are journaled the ends of a roller 88. Journaled transversely in suitable bearings formed on the tops of the frames 44 at a point slightly below and in the rear of the roller 88 is a shaft 89, which carries a drum 90, and a pinion 91, that is in mesh with and driven by the gear-wheel 46. Formed on the inner face of the frame 44 nearest the partition at the top thereof and in a plane above that occupied by the top of the gear-wheel 46, is a lug 91ª, the same lying directly in the path of travel of the weighted arm of the bell-crank 50.

Arranged upon a stud projecting from the inner face of the frame 44 nearest the partition 4 is a bell-crank 92, the shorter arm of which lies in the path of travel of the lug 49, formed on the ratchet-wheel 47, and to the upper end of the longer arm of said bell-crank is pivoted a detent 93, the point of which engages between the teeth of the ratchet-wheel 77, the same being held in such position by a retractile coil-spring 94.

95 indicates a gravity-pawl, the point of which extends downwardly and lies directly in the path of travel of the notch 54, formed in the hub of the bell-crank 50.

96 indicates a bell-crank that is pivoted upon a stud projecting from the inner face of the frame 44 nearest the partition, and extending laterally from said bell-crank 96 is a weighted arm 97. The downwardly-pending arm of this bell-crank 96 has pivoted to it one end of a rod 98, the same extending rearwardly and being fixed to the gravity-pawl 95. The upwardly-extending arm of said bell-crank is of such length as that in swinging it will just clear the sleeve 74 around the shaft 73. Carried by the side of the cash-till nearest the partition 4 and adjacent the rear end of said till is a block 99, that during its travel engages against the antifriction-roller 53 on the lower end of the longer arm of the bell-crank. Standards 100 and 100ª, provided with journal-bearings in their upper ends, are arranged on the bottom of the casing within the compartment occupied by the recording mechanism, said journal-bearings having mounted for rotation therein shafts 101 and 101ª.

In the form of the till and recorder shown in Fig. 11 the cash-till is located in a casing 102, that is constructed below the bottom 2 of the casing previously described, and in this form the long arm of the bell-crank 50 is engaged by a pin 103, projecting upwardly from the rear end of the cash-till. Said pin operates in a slot formed in the bottom 2.

In the use of my improved recorder I make use of three webs of paper, which I term the "record-strip," the "voucher-strip," and the "transfer-strip." The record-strip in the original roll is wound upon the shaft 101 at the rear end of the machine, and from thence the web of the roll passes upwardly around the roller 79, that is in front of the shaft 75, from thence upwardly over the roller 84 at the rear end of the plate 83, over said plate 83 around the roller 84 at the front end of said plate in rear of the roller 79, which is in rear of the shaft 73, and from thence the web is passed around the drum 64 and the end thereof held by any suitable means in the slot 64ª. By this arrangement the record-strip is retained within the recorder.

The transfer-strip is originally wound upon the sleeve 74, carried by the shaft 73, the inner end being held in the slots formed in said shaft and sleeve. The outer end of the web of this strip passes upwardly over the roller 84 at the front end of the plate 83, over said plate 83 and a portion of the record-strip thereupon, from thence around the roller 84 at the rear end of said plate 83, and from thence to and around the sleeve 76, carried by the shaft 75, the end being held in the slots formed in said sleeve and shaft.

The voucher-strip, which is originally in the form of a roll, is located upon the shaft 101ª at the forward end of the machine, and from thence the web of said roll is passed between the printing-roller 68 and drum 66ª, from thence over the roller 84, located at the forward end of the plate 83, over said plate 83 and the transfer-strip and record-strip located thereon, from thence between the roller 88 and drum 90, and from thence out of the casing through the aperture 85 in front of the knife-edge 87 of the plate 86.

The cash-till and recorder being constructed as herein described and the paper strips being passed through the recorder in the manner just specified, the operation of the various parts is as follows:

The clerk on making a sale first makes a record of said sale, together with any note regarding said sale, upon the voucher-strip that is exposed through the aperture 82, and as said record is made it is transferred to the record-strip by means of the transfer-strip between said voucher-strip and record-strip. If coin or coins be tendered the clerk in payment of the transaction, said coin or coins is passed through the slot 7 and will be deposited on the endless carrier 29. The clerk now operates the cash-till and draws said till outwardly, and by this movement the weighted arm 42 rides off from the rear end of the cash-till and assumes an approximately vertical position, this movement bringing the pawl 43, carried by the curved upper end of said arm, to a point immediately in the rear of the uppermost one of the lugs or teeth 38 on the ratchet-wheel 37. The curved weighted arm 33 will swing downwardly as it rides off from the rear end of the till, and by so doing the point or forward end of the wing 32 will be thrown upwardly into engagement with the under side of the endless carrier 29, thus cutting off the passage between the drum 26 and the extended lower end 30 of the rear end of the frame 13. The bell-crank 50, which has previously been held in an elevated position by reason of the block 99 engaging against the roller 53, will, upon the withdrawal of said till, swing downwardly to its normal position, or as that shown in Fig. 3, and the point of the spring-actuated pawl 52, carried by the weighted arm of said bell-crank, will engage behind one of the teeth 48 of the ratchet-wheel 47. The till now being opened, the change, if any, may be removed from said till, after which the clerk returns the drawer to its proper position within the casing, which movement causes the following operations to take place: The weighted curved arm 33 will ride upon one of the partitions at the rear end of the till and assume a position as clearly shown in Fig. 2, which will carry the point of the wing 32 away from the under side of the endless carrier 29, thus opening the passage between the roller 26 and the extended downward end 30 of the rear portion of the frame 13, which will allow any coins that have been located in the rear portion of the coin displayer and distributer to pass downwardly into the till and be distributed according to their size and value. The weighted lower end of the arm 42 will ride upwardly over the rear end of the cash-till, and by so doing the curved upper end 41 of said arm will move forward to its original position. The pawl 43, carried by said curved upper end, will engage against the lug or tooth of the ratchet-wheel 37, rotate the same a quarter of a turn, and necessarily rotating the gear-wheel 39 a quarter of a turn. The pinion 27 being in mesh with the gear-wheel 39 will be rotated approximately a half-turn, and in so doing the double eccentric 28, located upon the same shaft which carries said pinion 27, will turn a half-revolution, and in so doing one of the ends of said eccentric will engage against the roller 21 and move the same rearwardly and upwardly, which movement will longitudinally oscillate the bar 20, to which the spindle of the roller 21 is fixed, this movement necessarily causing a partial rotation of the shafts 17, which carry the wings 18. By said partial rotation of said shafts these wings will be raised and the coin located upon the endless carrier 29 will be moved rearwardly a slight distance, as said endless carrier is moved by being carried upon the drum 26, which is in turn carried by the shaft 25, that carries the double eccentric 28 and pinion 27. When one-half of the double eccentric has passed the roller 21, the longitudinally-oscillating bar 20 and shafts 17, carrying the wings 18, will reassume their normal positions, the lower ends of said wings resting upon that portion of the endless carrier 29 that passes over the bottom 24.

Simultaneous with the movements just described, which are caused by moving the drawer inwardly to its normal position, the following operations of the recording portion of my improved device take place: The block 99, engaging against the roller 53, will cause the weighted arm of the bell-crank 50 to move upwardly, and the spring-actuated pawl 52, carried by said arm, will engage against one of the teeth 48 of the ratchet-wheel 47, and said ratchet-wheel and master gear-wheel 46, that is fixed to said ratchet-wheel, will be moved approximately one-quarter of a turn. The rotary movement of the gear-wheel 46 will be imparted to the gear-wheel 57 by means of the pinion 58, and the drum 64, carried by the shaft 61, the same carrying the gear-wheel 57, will be rotated and a portion of the record-strip will be unwound from the roll located upon the shaft 101 and be wound upon said drum 64. Simultaneous with this movement of the record-strip the rotary motion of the master-wheel 46 will be imparted to the drum 90, located upon the shaft 89, which carries the pinion 91, that is in mesh with the master gear-wheel 46, and, said drum 90 being in frictional contact with the roller 88, a portion of the voucher-strip which passes between said roller 88 and the drum 90 will be moved outwardly through the aperture 85 in front of the knife-edge 87 of the plate 80, said portion being that upon which the record of the transaction has been made. The rotary motion of the gear-wheel 57 is imparted to the drum 66ª through the pinion 66, located upon the shaft 65, which carries said drum 66ª, and as the web of the voucher-strip passes between the printing-roller 68 and said drum 66ª the same will be printed upon before passing onto the plate 83 beneath the aperture 82. With every complete revolution of the ratchet-wheel 47 the lug 49, carried thereby, will engage against the short arm of the bell-crank 92 and move the same so as to draw the detent 93 downwardly, which in turn will partially rotate the shaft 75. By so doing a portion of the transfer-paper will unwind from the shaft 73 and wind upon said shaft 75. The gravity-pawl 78 prevents a reverse movement of the shaft 75 at the same time the spring 94 draws the detent 93 upwardly. When the greater body or all of the transfer-strip is located upon the shaft 73, the free arm of the bell-crank 96 will ride upon the roll, and by so doing will hold the point of the pawl 95 out of the path of travel of the notch 54, but when the strip of transfer-paper has been completely unwound from the shaft 73 the point of the free arm of said bell-crank 96 will have moved upwardly toward the center of said shaft 73, owing to the weight of the arm 97, and this movement will through the connecting-rod 98 cause the point of the pawl 95 to engage in the notch 54, formed in the hub of the bell-crank 50, and thus hold the said bell-crank in an inoperative position, by which position the clerk or operator of the recorder understands that the transfer-paper has all been wound upon the shaft 75 and should be renewed or changed.

After the section of the voucher-strip having the record of the transaction thereon has moved outwardly through the aperture 85, it may be torn off by engaging it against the knife-edge 87 in the usual manner. This voucher, together with the change previously taken from the cash-till, is handed to the purchaser together with the purchased article and the operation is complete. All coin taken in by the salesman should be passed through the slot 7 and into the coin-displayer. Thus any dispute as to the amount handed the salesman by the purchaser is avoided, as the last coins passed into said displayer may be clearly discerned through the transparent plate 6. By removing the top plate 3 of the casing either the coin-displayer or recording mechanism may be expeditiously removed for inspection or adjustment. If desired, the recording mechanism may be constructed and operated independently of the cash-till and coin-displayer. In this instance the connection with the main gear-wheel is operated manually. The wing 32 prevents any coins from dropping downwardly between the lower end 30 and the drum 26 while the cash-drawer is withdrawn. The drum 64 may be rotated in either direction independent of the shaft 56 after said drum has been moved toward the gear-wheel 57, which movement will overcome the resistance offered by the coil-spring 63 and moves the end of the sleeve 61 in which are formed the notches 62 away from the pin 60.

Thus it will be seen how I have constructed a combined cash-till and recorder that is entirely automatic in all its operations, being dependent only upon the longitudinal movement of the cash-till. All coins placed in the till are prominently displayed according to their respective values ere passing into said till and are distributed upon passing into the till, a record of all transactions is kept and stored within the casing of the device, and a voucher or record of each transaction made is fed from the recorder to be delivered to the purchaser, and such a combined cash-till and recorder is simple, both in construction and operation, is very light, compact, and efficient in use.

I claim—

1. In a combined cash-till and recorder, a rectangular casing, a partition dividing said casing into two longitudinal compartments, a cash-till operating in the lower portion of the larger compartment, a rectangular frame arranged in said larger compartment above the cash-till, rollers journaled transversely at each end of said frame, an endless carrier operating around said rollers, a series of shafts journaled transversely in the rectangular frame above the endless carrier, wings formed integral with said shafts, a connecting-rod connecting the ends of said shafts to cause the same to move simultaneously, a double eccentric arranged upon the shaft of one of the rollers for operating the simultaneously-moving shafts, and suitable means for operating the shaft upon which said eccentric is located, said means being dependent upon the longitudinal movement of the cash-till.

2. In a combined cash-till and recorder, a rectangular casing, a partition dividing said casing into two longitudinal compartments, a cash-till operating in the lower portion of the larger compartment, a rectangular frame arranged in said larger compartment above the cash-till, rollers journaled transversely at each end of said frame, an endless carrier operating around said rollers, a series of shafts journaled transversely in the rectangular frame above the endless carrier, wings formed integral with said shafts, a connecting-rod connecting the ends of said shafts to cause the same to move simultaneously, a double eccentric arranged upon the shaft of one of the rollers for operating the simultaneously-moving shafts, a wing pivoted so its front edge will engage against the under side of the endless carrier, a weighted curved arm carried by said wing, and suitable means for operating the shaft upon which the eccentric is located, said means being dependent upon the longitudinal movement of the cash-till.

3. In a combined cash-till and recorder, a coin-displayer constructed with a frame, a pair of rollers journaled transversely at each end of said frame, an endless carrier operating around said rollers, a double eccentric carried by the rear one of the rollers for operating certain mechanism in the coin-displayer, a pinion carried by said roller adjacent the eccentric, a stud projecting from a partition in the casing of the device, a gear-wheel mounted thereon in mesh with the pinion, a ratchet-wheel carried by said gear-wheel, and a weighted arm having a curved upper end carrying a spring-actuated pawl that engages the teeth of said ratchet-wheel, the lower end of said weighted arm normally resting upon one of the partitions of the cash-till.

4. In a combined cash-till and recorder, the combination of a coin-displayer, comprising the frame 13, shafts 22 and 25 journaled at the ends of said frame, rollers 23 carried by said shafts, an endless carrier 29, transverse shafts 17, wings 18 carried thereby, a longitudinally-oscillating bar 20, a double eccentric 28 carried by the shaft 25, a pinion 27 carried by said shaft, and the means for operating the coin-displayer, which means comprise the gear-wheel 39 arranged for rotation upon a stud carried by the casing, a ratchet-wheel 37, weighted arm 42 having the curved upper end pivoted upon the stud, and the spring-actuated pawl 43 carried by said arm for engaging the teeth of the ratchet-wheel.

5. In a combined cash-till and recorder, a rectangular casing, a partition dividing said casing into two longitudinal compartments, a cash-till operating in the lower portion of the larger compartment, a block carried by the rear end of said cash-till, the same projecting into the smaller compartment, a coin-displaying device arranged in the larger compartment above the cash-till, means for operating said coin-displaying device, the same being dependent upon the longitudinal movement of the cash-till, a pair of frames arranged in the smaller compartment, a stud carried by the frame nearest the partition of the casing, a gear-wheel mounted for rotation upon said stud, a ratchet-wheel carried by said gear-wheel, a weighted bell-crank pivoted upon said stud, a spring-actuated pawl carried by the weighted arm of the bell-crank, the same engaging the teeth of the ratchet-wheel, and an antifriction-roller carried by the other arm of the bell-crank which is engaged by the block carried by the cash-till, which bell-crank, ratchet-wheel and gear-wheel serve as means for operating the recording mechanism, substantially as shown and described.

6. In a combined cash-till and recorder, a rectangular casing, a top therefor, a raised portion in said top at one side, the same being glazed and provided with a transverse slot, said top being provided with a pair of transverse apertures to one side of the raised portion, a cash-till arranged for longitudinal movement in the lower portion of the larger compartment, a block carried by the side of said till at its rear end, the same projecting into the smaller compartment, a coin-displayer located beneath the glazed portion of the top, means for operating the same which means are dependent upon the longitudinal movement of the cash-till, a pair of frames arranged in the smaller compartment, a plate extending transversely between said frames at a point beneath the larger one of the apertures in the top of the casing, suitably-arranged shafts journaled transversely between said frames, the same carrying rollers, suitable rolls of paper arranged in the smaller compartment and properly fed between the rollers and over the plate beneath the aperture, a strip of transfer-paper arranged between the strips of paper, a printing-roller arranged to print upon one of the strips of paper before it passes onto said plate, and suitable mechanism for operating the various rollers, said mechanism being actuated by the longitudinal movement of the cash-till.

7. In a combined cash-till and recorder, a paper-feeding device, the same comprising a journaled shaft, a drum located upon said shaft on which the paper is to wind, a ratchet-wheel carried by one end of said shaft, a gravity-pawl for preventing a reverse movement of the ratchet-wheel, a bell-crank fulcrumed to a portion of the frame of the machine below the shaft, a spring-actuated detent pivoted to the long arm of said bell-crank the point of which engages the teeth of the ratchet-wheel, and suitable means for engaging the shorter arm of the bell-crank in order to operate the same and the detent.

8. In combination with an operated bell-crank, in a combined cash-till and recorder, in the hub of which bell-crank is formed a notch, a gravity-pawl pivoted to the frame of the device, the point of which is in the path of travel of the said notch, a bell-crank fulcrumed to the frame of the device at a point adjacent one of the rollers, a rod connecting the short arm of the bell-crank with the gravity-pawl, and a weighted arm formed integral with said bell-crank, the tendency of which is to throw the point of the gravity-pawl into said notch and the free end of the bell-crank against the roller.

In testimony whereof I affix my signature in presence of two witnesses.

WILLIAM THOMAS BLAINE.

Witnesses:
JOHN C. HIGDON,
MAUD GRIFFIN.